(12) United States Patent
Nozu et al.

(10) Patent No.: US 10,773,706 B2
(45) Date of Patent: Sep. 15, 2020

(54) APPARATUS FOR CONTROLLING FOUR-WHEEL DRIVE VEHICLE

(71) Applicant: JTEKT Corporation, Osaka-shi (JP)

(72) Inventors: Tomohiro Nozu, Anjo (JP); Hiroshi Yoshimoto, Kashihara (JP); Shuuji Kimura, Kashihara (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 16/439,867

(22) Filed: Jun. 13, 2019

(65) Prior Publication Data

US 2019/0381989 A1 Dec. 19, 2019

(30) Foreign Application Priority Data

Jun. 18, 2018 (JP) .................................. 2018-115146

(51) Int. Cl.
*B60W 10/119* (2012.01)
*B60W 10/18* (2012.01)
*B60W 40/12* (2012.01)

(52) U.S. Cl.
CPC .......... *B60W 10/119* (2013.01); *B60W 10/18* (2013.01); *B60W 40/12* (2013.01);
(Continued)

(58) Field of Classification Search
CPC .... B60W 10/04; B60W 10/119; B60W 10/14; B60W 10/16; B60W 10/184;
(Continued)

(56) References Cited

U.S. PATENT DOCUMENTS

| 2004/0186647 A1* | 9/2004 | Ono | B60W 10/04 701/70 |
| 2006/0217867 A1* | 9/2006 | Ono | B60T 8/1755 701/70 |

(Continued)

FOREIGN PATENT DOCUMENTS

| JP | 2011-001003 | 1/2011 |
| JP | 2012-132996 | 7/2012 |
| JP | 2018-076949 | 5/2018 |

*Primary Examiner* — Edwin A Young
(74) *Attorney, Agent, or Firm* — Oblon, McClelland, Maier & Neustadt, L.L.P.

(57) ABSTRACT

An apparatus for controlling a four-wheel drive vehicle includes a tire friction circle calculator that calculates the size of a tire friction circle of each wheel on the basis of vehicle information including a tire vertical load, a resultant force calculator that calculates the magnitude of a resultant force of tire lateral and longitudinal forces for each wheel, a tire-friction-force usage rate calculator that calculates a tire-friction-force usage rate of each wheel that is the ratio of the magnitude of the resultant force to the size of the tire friction circle, and a driving-braking force adjustment controller that adjusts driving force or braking force applied to each wheel. When the tire-friction-force usage rate of any wheel exceeds a predetermined threshold of less than one, the driving-braking force adjustment controller restrains an increase in the driving force or the braking force of the wheel while increasing the driving force or the braking force of at least one of the other wheels that is selected on the basis of driving operation information indicative of the state of a driving operation by a driver.

4 Claims, 8 Drawing Sheets

(52) U.S. Cl.
CPC ..... *B60W 2530/10* (2013.01); *B60W 2530/20* (2013.01); *B60W 2540/10* (2013.01); *B60W 2710/18* (2013.01); *B60W 2720/406* (2013.01)

(58) Field of Classification Search
CPC ............... B60W 30/02; B60W 30/045; B60W 30/18145; B60W 30/18172; B60W 40/064; B60W 40/068; B60W 40/12; B60W 2040/1307; B60W 2050/0028; B60W 50/06; B60W 2520/26; B60W 2520/263; B60W 2520/266; B60W 2520/40; B60W 2530/20; B60W 2720/26
See application file for complete search history.

(56) References Cited

U.S. PATENT DOCUMENTS

2007/0055432 A1* 3/2007 Koibuchi ............. B60W 40/114
 701/72
2018/0134152 A1 5/2018 Nagayama et al.

* cited by examiner

APPARATUS FOR CONTROLLING FOUR-WHEEL DRIVE VEHICLE

INCORPORATION BY REFERENCE

The disclosure of Japanese Patent Application No. 2018-115146 filed on Jun. 18, 2018 including the specification, drawings and abstract, is incorporated herein by reference in its entirety.

BACKGROUND OF THE INVENTION

1. Field of the Invention

The invention relates to an apparatus for controlling a four-wheel drive vehicle capable of adjusting driving force or braking force applied to front and rear wheels.

2. Description of Related Art

Methods for controlling a four-wheel drive vehicle capable of transmitting driving force to both front wheels and rear wheels are disclosed in, for example, Japanese Unexamined Patent Application Publication (Translation of PCT Application) No. 2012/132996 (JP 2012/132996 A), Japanese Patent Application Publication No. 2018-76949 (JP 2018-76949 A), and Japanese Patent Application Publication No. 2011-1003 (JP 2011-1003 A). These methods are intended to improve vehicle traveling stability.

In a four-wheel drive vehicle disclosed in JP 2012/132996 A, first torque is calculated on the basis of a difference in rotation speed between front and rear wheels, second torque is calculated on the basis of an accelerator operation amount and a vehicle speed, and driving force corresponding to command torque that is the sum of the first torque and the second torque is transmitted to the rear wheels. In a four-wheel drive vehicle disclosed in JP 2018-76949 A, out of a steering angle-based turning radius that is determined in accordance with a steering angle, and a limit turning radius that is the minimum value of a turning radius that allows the vehicle to turn stably, the larger one is set as a target turning radius, and a ratio in which driving force is disturbed to each wheel is adjusted such that the rotation speeds of the right and left front wheels and the right and left rear wheels approach target rotational speeds corresponding to the target turning radius and a vehicle speed. In a four-wheel drive vehicle disclosed in JP 2011-1003 A, tire force of each wheel and a friction circle limit of each tire force are calculated, and if the sum of the tire forces of the front wheels exceed the sum of the friction circle limits of the front wheels, excess tire force that is a difference resulting from the subtraction of the sum of the friction circle limits of the front wheels from the sum of the tire forces of the front wheels is distributed to the rear wheels by control of a multi-plate transfer clutch.

One concern with these methods may be that the minimum friction force required to allow a vehicle to travel without slip varies over time with change in load during a turn or during acceleration/deceleration. During acceleration, the front wheels tend to slip due to a load shift from the front wheels to the rear wheels. During a turn, the inner wheels in the direction of the turn tend to slip due to a load shift from the inner wheels to the outer wheels in the direction of the turn. Further, for example, in the four-wheel drive vehicle disclosed in JP 2011-1003 A, the ratio in which driving force is distributed between the front and rear wheels is changed after the tire forces of the front wheels exceed the friction circle limits of the front wheels. According to this control, since the tire forces of the front wheels remain above the friction circle limits of the front wheels for a predetermined period of time including at least a response time of the clutch, the front wheels may slip during this period, and consequently vehicle traveling stability may be compromised.

SUMMARY OF THE INVENTION

A purpose of the invention is to provide an apparatus for controlling a four-wheel drive vehicle in a manner that reduces the likelihood of occurrence of wheel slip during a turn or during acceleration/deceleration, thus improving vehicle traveling stability.

An aspect of the invention provides an apparatus for controlling a four-wheel drive vehicle including two front wheels and two rear wheels, each of the four wheels having a tire. The apparatus includes the following: a tire friction circle calculator that calculates the size of a tire friction circle of each of the four wheels on the basis of vehicle information including a vertical load on the tire; a resultant force calculator that calculates the magnitude of a resultant force of lateral and longitudinal forces of the tire for each of the four wheels; a tire-friction-force usage rate calculator that calculates a tire-friction-force usage rate of each of the four wheels, the tire-friction-force usage rate being a ratio of the magnitude of the resultant force to the size of the tire friction circle; and a driving-braking force adjustment controller that adjusts driving force or braking force applied to each of the four wheels. When the tire-friction-force usage rate of any of the four wheels exceeds a predetermined threshold of less than one, the driving-braking force adjustment controller restrains an increase in the driving force or the braking force of the any of the four wheels while increasing the driving force or the braking force of at least one of the others of the four wheels. The at least one of the others of the four wheels is selected on the basis of driving operation information indicative of the state of a driving operation by a driver.

According to the above aspect, the apparatus controls the four-wheel drive vehicle in a manner that reduces the likelihood of occurrence of wheel slip during a turn or during acceleration/deceleration, thus improving vehicle traveling stability.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
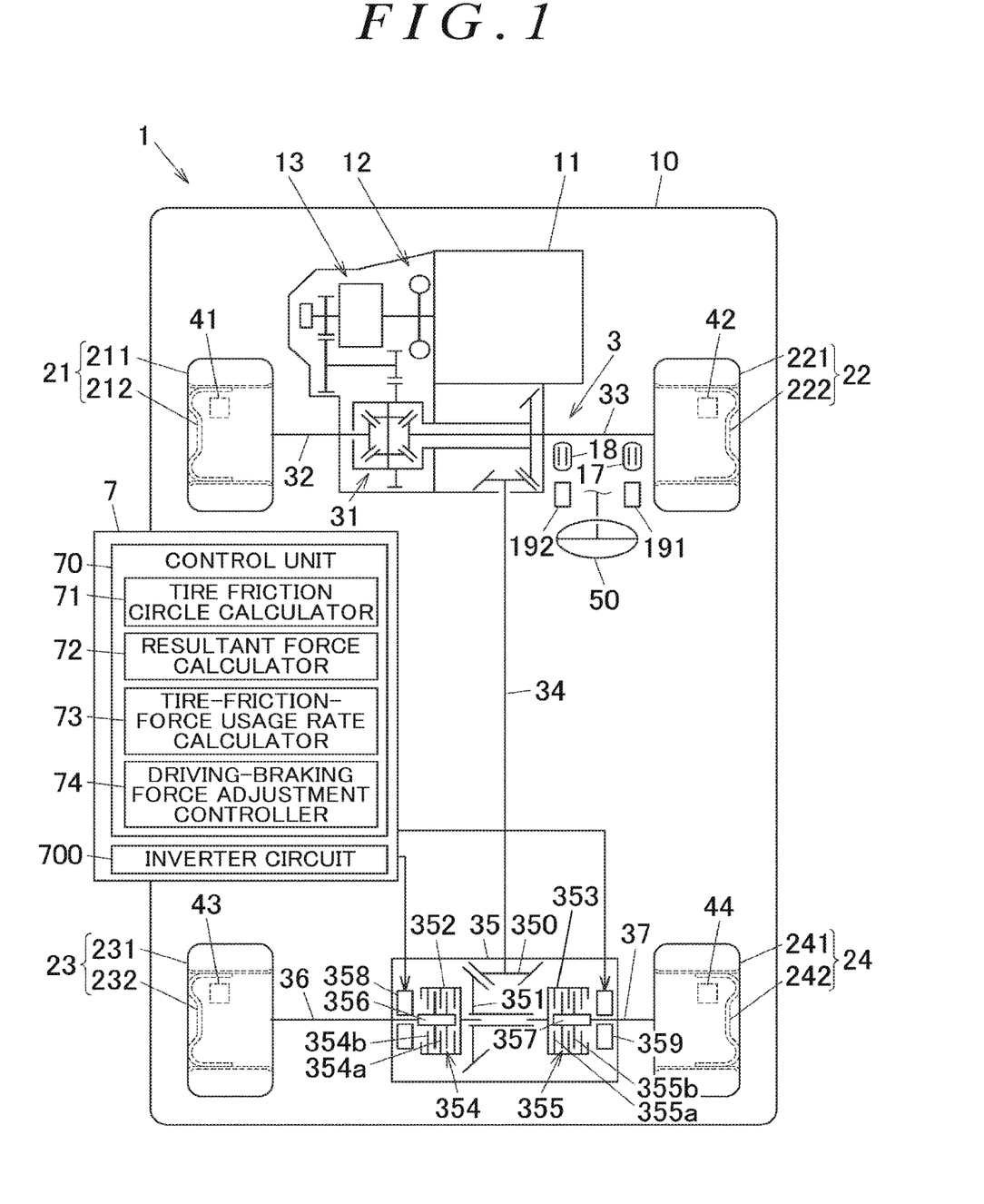
FIG. 1 is a diagram schematically illustrating an example structure of a four-wheel drive vehicle equipped with a control apparatus according to a first embodiment of the invention.
Figure 2:
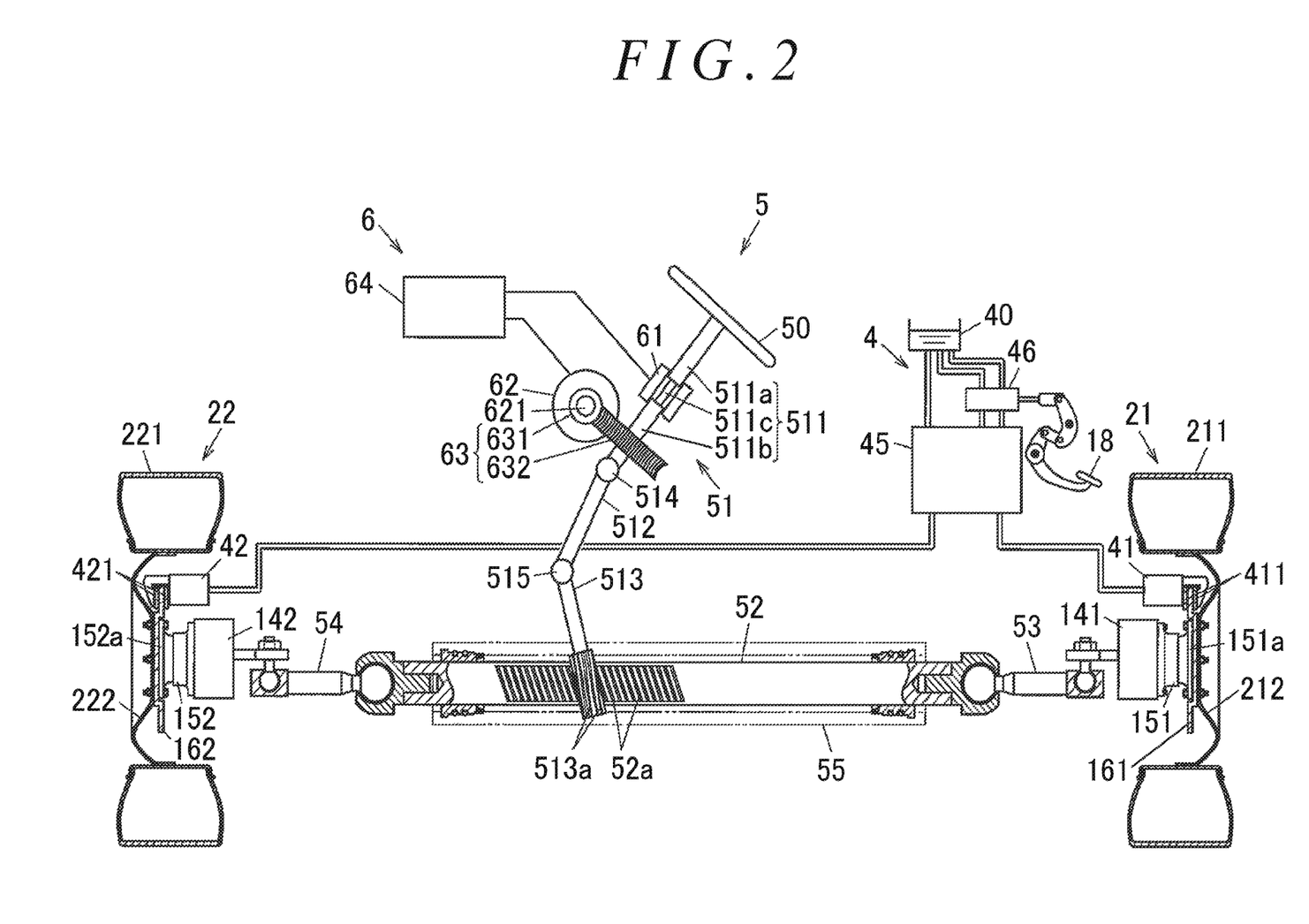
FIG. 2 is a diagram schematically illustrating a braking system, a steering system, and a steering assist system of the four-wheel drive vehicle.

A first embodiment of the invention is described with reference to FIGS. 1 to 5. FIG. 1 is a diagram schematically illustrating an example structure of a four-wheel drive vehicle 1 equipped with a control apparatus 7 according to the first embodiment. FIG. 2 is a diagram schematically illustrating a braking system 4, a steering system 5, and a steering assist system 6 of the four-wheel drive vehicle 1.

The four-wheel drive vehicle 1 includes the following: a vehicle body 10; an engine 11 that serves as a drive source; a torque converter 12; a transmission 13; right and left front wheels 22 and 21; right and left rear wheels 24 and 23; a driving force transmission system 3 that transmits the output of the transmission 13 to the front wheels 21 and 22 and the rear wheels 23 and 24; the braking system 4 (refer to FIG. 2) that brakes the front wheels 21 and 22 and the rear wheels 23 and 24; the steering system 5 (refer to FIG. 2) that steers the front wheels 21 and 22; the steering assist system 6 (refer to FIG. 2); and the control apparatus 7. The wheels 21, 22, 23, and 24 respectively has tires 211, 221, 231, and 241 and rims 212, 222, 232, and 242. The tires 211, 221, 231, and 241 are respectively mounted on the rims 212, 222, 232, and 242. Each of the tires 211, 221, 231, and 241 has an equal outside diameter and an equal tread width.

The driving force transmission system 3 includes a front differential 31, front drive shafts 32 and 33, a propeller shaft 34, a driving force distribution unit 35, and rear drive shafts 36 and 37.

The driving force distribution unit 35 distributes driving force input from the propeller shaft 34 to the rear wheels 23 and 24 via the rear drive shafts 36 and 37. The driving force distribution unit 35 includes the following: a pinion gear 350 that rotates along with the propeller shaft 34; a ring gear 351 that meshes with the pinion gear 350; first and second clutch housings 352 and 353 that rotate as a unit with the ring gear 351; first and second multi-plate clutches 354 and 355 that are respectively housed in the first and second clutch housings 352 and 353; first and second output shafts 356 and 357 to which the driving force is transmitted respectively through the first and second multi-plate clutches 354 and 355; and first and second actuators 358 and 359 that respectively press the first and second multi-plate clutches 354 and 355.

The ring gear 351 and the first and second clutch housings 352 and 353 are aligned in a vehicle lateral direction and rotate about a rotation axis extending in the vehicle lateral direction. The left rear wheel 23 receives the driving force transmitted through the first output shaft 356 and the drive shaft 36 that rotates along with the first output shaft 356. The right rear wheel 24 receives the driving force transmitted through the second output shaft 357 and the drive shaft 37 that rotates along with the second output shaft 357.

The first multi-plate clutch 354 includes the following: multiple outer clutch plates 354a that rotate as a unit with the first clutch housing 352; and multiple inner clutch plates 354b that rotate as a unit with the first output shaft 356. The outer clutch plates 354a and the inner clutch plates 354b frictionally contact each other by receiving pressing force from the first actuator 358. The second multi-plate clutch 355 includes the following: multiple outer clutch plates 355a that rotate as a unit with the second clutch housing 353; and multiple inner clutch plates 355b that rotate as a unit with the second output shaft 357. The outer clutch plates 355a and the inner clutch plates 355b frictionally contact each other by receiving pressing force from the second actuator 359.

Each of the first and second actuators 358 and 359 includes, for example, the following: a ball and cam mechanism that converts rotational force to axial pressing force; and an electromagnetic clutch or an electric motor, for actuating the ball and cam mechanism. The first actuator 358 presses the first multi-plate clutch 354 with pressing force corresponding to electric current supplied from the control apparatus 7. The second actuator 359 presses the second multi-plate clutch 355 with pressing force corresponding to electric current supplied from the control apparatus 7. The control apparatus 7 increases and decreases the current supplied to each of the second and first actuators 359 and 358 so as to adjust the driving force distributed to each of the right and left rear wheels 24 and 23.

The driving force transmission system 3 always transmits the output of the transmission 13 to the right and left front wheels 22 and 21 through the front differential 31 and the front drive shafts 33 and 32. The driving force transmission system 3 transmits, to the left rear wheel 23, the driving force corresponding to the current supplied to the first actuator 358 while transmitting, to the right rear wheel 24, the driving force corresponding to the current supplied to the second actuator 359. This structure enables adjustment of both a front-rear driving force distribution ratio and a right-left driving force distribution ratio. The front-rear driving force distribution ratio is the ratio between the driving force distributed to the front wheels 21 and 22 and the driving force distributed to the rear wheels 23 and 24. The right-left driving force distribution ratio is the ratio between the driving force distributed to the right rear wheel 24 and the driving force distributed to the left rear wheel 23.

As illustrated in FIG. 2, the steering system 5 includes the following: a steering wheel 50 as a steering member; a steering shaft 51 coupled to the steering wheel 50; a rack shaft 52 that reciprocates in the vehicle lateral direction; left and right tie rods 53 and 54; and a rack housing 55. In FIG. 2, the rack housing 55 is represented by a hidden outline (a long dashed double-short dashed line) and the inside of the rack housing 55 is illustrated.

The steering shaft 51 includes the following: a column shaft 511; an intermediate shaft 512 coupled to the column shaft 511 via a universal joint 514; and a pinion shaft 513 coupled to the intermediate shaft 512 via a universal joint 515. The column shaft 511 includes the following: an upper shaft 511a fixed at one end to the steering wheel 50; a lower shaft 511b coupled to the intermediate shaft 512 via the universal joint 514; and a torsion bar (a torsion shaft) 511c that connects the upper shaft 511a and the lower shaft 511b.

The pinion shaft 513 has pinion teeth 513a in mesh with rack teeth 52a of the rack shaft 52. The mesh between the pinion teeth 513a and the rack teeth 52a causes the rack shaft 52 to move axially in accordance with steering input from a driver to the steering wheel 50. The rack shaft 52 is a steered shaft and steers the front wheels 22 and 21 via right and left knuckles 142 and 141 that are included in a suspension system and right and left hubs 152 and 151. The rim 212 of the front wheel 21 and a brake disc 161 are fixed to a flange 151a of the hub 151. The rim 222 of the wheel 22 and a brake disc 162 are fixed to a flange 152a of the hub 152.

The steering assist system 6 includes the following: a torque sensor 61 that detects steering torque applied by a driver to the steering wheel 50; an electric motor 62; a speed reduction mechanism 63 that transmits rotational output of an output shaft 621 of the electric motor 62 to the lower shaft 511b while reducing the speed of the rotational output, so as to supply the lower shaft 511b with the torque of the electric motor 62 as steering assist force; and an electronic control unit (ECU) 64. The speed reduction mechanism 63 includes a worm 631 and a worm wheel 632 in mesh with the worm 631. The worm 631 rotates as a unit with the output shaft 621 of the electric motor 62. The worm wheel 632 rotates as a unit with the lower shaft 511b. The torque sensor 61 magnetically detects the amount of twisting of the torsion bar 511c due to the steering torque and outputs a detection signal indicative of the detected amount to the ECU 64. The electric motor 62 is, for example, a three-phase brushless motor. The electric motor 62 rotates by electric current that is supplied from the ECU 64 in accordance with the steering torque and a vehicle speed.

The ECU 64 outputs, to an in-vehicle network such as a controller area network (CAN), information indicating the steering torque detected by the torque sensor 61 and the steering assist force transmitted to the lower shaft 511b. The control apparatus 7 obtains the information indicating the steering torque and the steering assist force via the in-vehicle network. The steering assist force is calculated on the basis of the motor current supplied to the electric motor 62 and the speed reduction ratio of the speed reduction mechanism 63.

The braking system 4 includes the following: a fluid reservoir 40; brake calipers 41 to 44 respectively provided to the wheels 21 to 24; a brake actuator 45 that supplies brake fluid to the brake calipers 41 to 44; and a master cylinder 46 that moves in response to depression of a brake pedal 18. The brake caliper 41 provided to the front wheel 21 squeezes the brake disc 161 between a pair of brake pads 411 by using hydraulic pressure of the brake fluid supplied from the brake actuator 45, thereby generating friction force that brakes the front wheel 21. The brake caliper 42 provided to the front wheel 22 squeezes the brake disc 162 between a pair of brake pads 421 by using hydraulic pressure of the brake fluid supplied from the brake actuator 45, thereby generating friction force that brakes the front wheel 22. The brake calipers 43 and 44 respectively provided to the rear wheels 23 and 24 operate in the same manner as the brake calipers 41 and 42.

The brake actuator 45 includes a hydraulic pump and a solenoid valve, and individually adjusts hydraulic pressure of the brake fluid supplied to each of the brake calipers 41 to 44. The control apparatus 7 outputs a brake control signal to the brake actuator 45 to individually adjust braking force applied to each of the wheels 21 to 24.

The control apparatus 7 includes a control unit 70 and an inverter circuit 700 that supplies electric current to the first and second actuators 358 and 359. The control unit 70 includes a tire friction circle calculator 71, a resultant force calculator 72, a tire-friction-force usage rate calculator 73, and a driving-braking force adjustment controller 74. The tire friction circle calculator 71 calculates the size of a tire friction circle of each of the wheels 21 to 24. The resultant force calculator 72 calculates the magnitude of a resultant force of tire lateral and longitudinal forces of each of the wheels 21 to 24. The tire-friction-force usage rate calculator 73 calculates a tire-friction-force usage rate of each of the wheels 21 to 24. The tire-friction-force usage rate is the ratio of the magnitude of the resultant force to the size of the tire friction circle. The driving-braking force adjustment controller 74 adjusts the driving force or the braking force applied to each of the wheels 21 to 24. The tire friction circle calculator 71, the resultant force calculator 72, the tire-friction-force usage rate calculator 73, and the driving-braking force adjustment controller 74 are implemented, for example, by programs that are executed by a central processing unit (CPU). In one example described below, the driving-braking force adjustment controller 74 serves as a driving force adjustment controller and adjusts the driving force applied to the front wheels 21 and 22 and the rear wheels 23 and 24 by changing the front-rear driving force distribution ratio and the right-left driving force distribution ratio.

The tire friction circle calculator 71 calculates the size of the tire friction circle of each of the wheels 21 to 24 on the basis of vehicle information. The vehicle information includes the following: a vertical load on each of the tires 211, 221, 231, and 241; and a road surface friction coefficient of each of the tires 211, 221, 231, and 241 against a road surface. The road surface friction coefficient may be estimated on the basis of, for example, at least one of the following: an ambient temperature; tire reaction force against steering; the frequency of operation of a windscreen wiper; and a road surface condition determined from an image that captures the road surface.

The vertical loads on the tires 211, 221, 231, and 241 may be calculated on the basis of, for example, the following: a vehicle-specific front-rear load distribution ratio that is the ratio between loads on the front wheels 21 and 22 and loads on the rear wheels 23 and 24 when the four-wheel drive vehicle 1 is at rest; a yaw rate of the four-wheel drive vehicle 1 that is traveling; the steering angle; and the vehicle speed. If the four-wheel drive vehicle 1 is equipped with a weight sensor integrated in a cushion of each seat to detect whether the seat is occupied by an occupant, the vertical loads on the tires 211, 221, 231, and 241 may be calculated by taking into account how the seats are occupied. Further, if the wheels 21 to 24 are provided with sensors capable of detecting the vertical loads, the vertical loads may be obtained from values detected (i.e., values actually measured) by the sensors.

The size of each of the tire friction circles represents the maximum friction force of the corresponding tire. For example, the size of the tire friction circle of the front wheel 21 may be calculated by multiplying the product of the vertical load on the tire 211 and the road surface friction coefficient of the tire 211 by a predetermined factor. The tire friction circles of the other wheels 22 to 24 can be calculated in the same manner as described above for the front wheel 21. During acceleration of the four-wheel drive vehicle 1, the loads on the front wheels 21 and 22 decrease while the loads on the rear wheels 23 and 24 increase. On the other hand, during deceleration of the four-wheel drive vehicle 1, the loads on the front wheels 21 and 22 increase while the loads on the rear wheels 23 and 24 decrease. During a left turn of the four-wheel drive vehicle 1, the loads on the right wheels 22 and 24 increase while the loads on the left wheels 21 and 23 decrease. On the other hand, during a right turn of the four-wheel drive vehicle 1, the loads on the right wheels 22 and 24 decrease while the loads on the left wheels 21 and 23 increase. Thus, the size of the tire friction circle changes dynamically with change in vehicle traveling condition.

Figure 3:
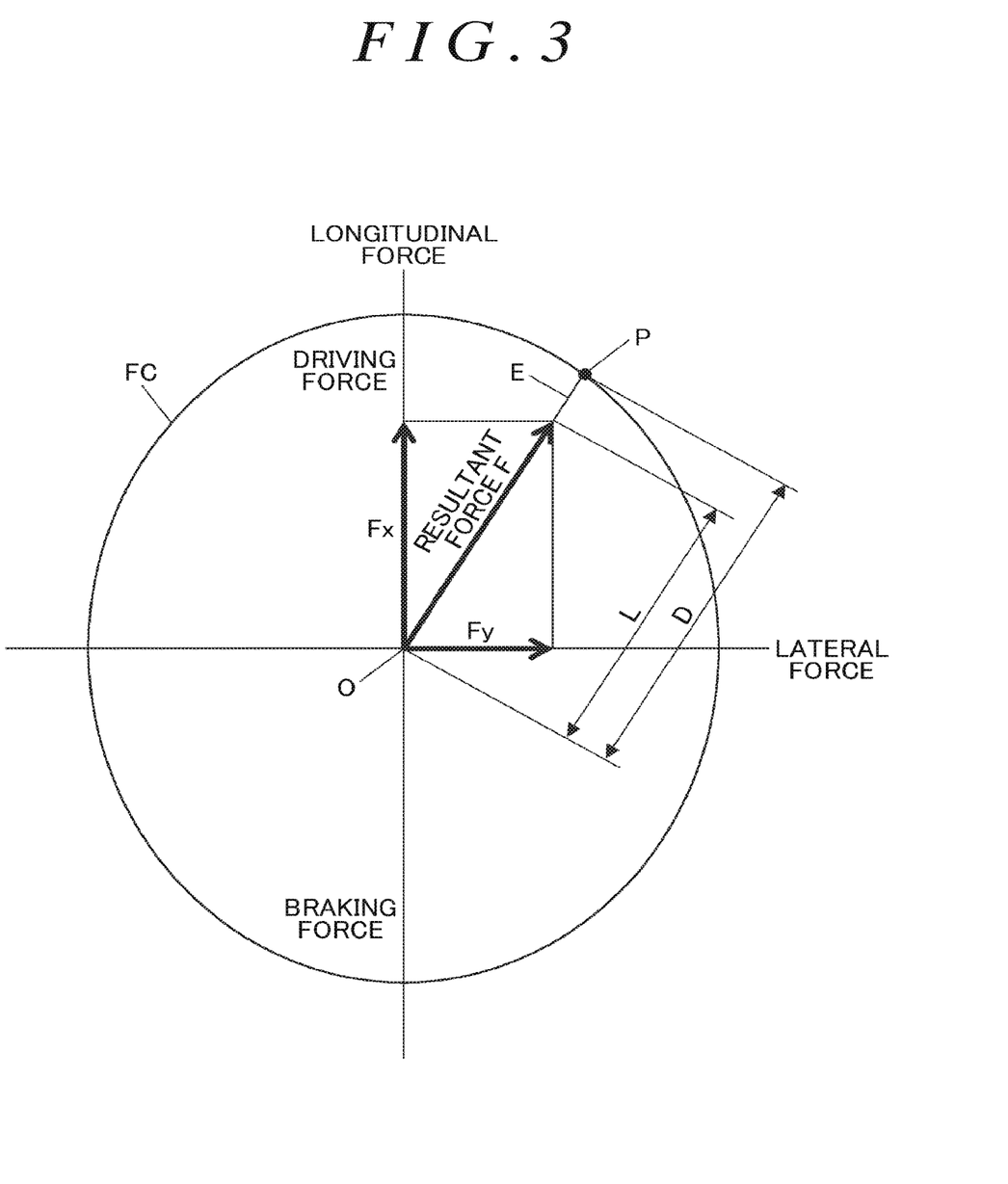
FIG. 3 is a diagram illustrating an example tire friction circle.

FIG. 3 is a diagram illustrating an example tire friction circle FC. A tire friction circle is sometimes expressed as a perfect circle. However, technically, the maximum value of friction force of a tire in a longitudinal direction (in a direction that the tire rolls) differs from the maximum value of friction force of the tire in a lateral direction. For this reason, the tire friction circle FC in FIG. 3 is expressed as an ellipse with a major axis in the longitudinal direction. In FIG. 3, a vector Fx represents a tire longitudinal force, a vector Fy represents a tire lateral force, and a vector F represents a resultant force of the tire longitudinal force and the tire lateral force.

The respective tire longitudinal forces of the wheels 21 to 24 are calculated from the driving force generated by the engine 11, a speed ratio of the transmission 13, and the amount of driving force transmitted through the first and second multi-plate clutches 354 and 355. The amount of driving force transmitted through the first multi-plate clutch 354 is calculated from the current supplied to the first actuator 358. The amount of driving force transmitted through the second multi-plate clutch 355 is calculated from the current supplied to the second actuator 359.

It is common to calculate the tire lateral force on the basis of the vehicle speed and the yaw rate. Unlike the common approach, according to the first embodiment, the resultant force calculator 72 calculates the tire lateral force on the basis of axial force acting on the rack shaft 52 in its axial direction during a turn of the four-wheel drive vehicle 1. The reason is that the tire lateral force is substantially proportional to the axial force of the rack shaft 52. The axial force of the rack shaft 52 has a predetermined relationship with force (self-aligning torque) that the front wheels 21 and 22, as steered wheels, being steered create to return to straight. Further, since the axial force of the rack shaft 52 is proportional to both the steering torque applied by a driver to the steering wheel 50 and the steering assist force generated by the steering assist system 6, the axial force of the rack shaft 52 is calculated by multiplying the sum of the steering torque and the steering assist force by a predetermined coefficient. Thus, according to the first embodiment, the resultant force calculator 72 first calculates the axial force of the rack shaft 52 on the basis of the sum of the steering torque and the steering assist force, and then calculates the tire lateral force from the calculated axial force.

One advantage of calculating the tire lateral force from the steering torque and the steering assist force over calculating the tire lateral force from the yaw rate is that the driving-braking force adjustment controller 74 starts processing earlier. Specifically, although there is a time lag between when the steering wheel 50 is operated and when the yaw rate is generated, the approach to calculating the tire lateral force from the steering torque and the steering assist force eliminates the effect of the time lag, thus improving vehicle traveling stability.

The tire-friction-force usage rate calculator 73 calculates the tire-friction-force usage rate on the basis of a length L of the vector F (i.e., the magnitude of the resultant force) and a distance D between an intersection P and a center O of the tire friction circle FC. As illustrated in FIG. 3, the intersection P is a point where an extension line E of the vector F intersects with the tire friction circle FC. The tire-friction-force usage rate is calculated by dividing the length L of the vector F by the distance D. In the example illustrated in FIG. 3, the tire-friction-force usage rate is 0.85 (i.e., 85%).

When the tire-friction-force usage rate of any of the wheels 21 to 24 exceeds a predetermined threshold of less than one, the driving-braking force adjustment controller 74 restrains an increase in the driving force of the wheel while increasing the driving force or the braking force of at least one of the other wheels. The at least one of the other wheels is selected on the basis of driving operation information indicative of the state of a driving operation by a driver. The predetermined threshold may be set to 0.8.

Figure 4:
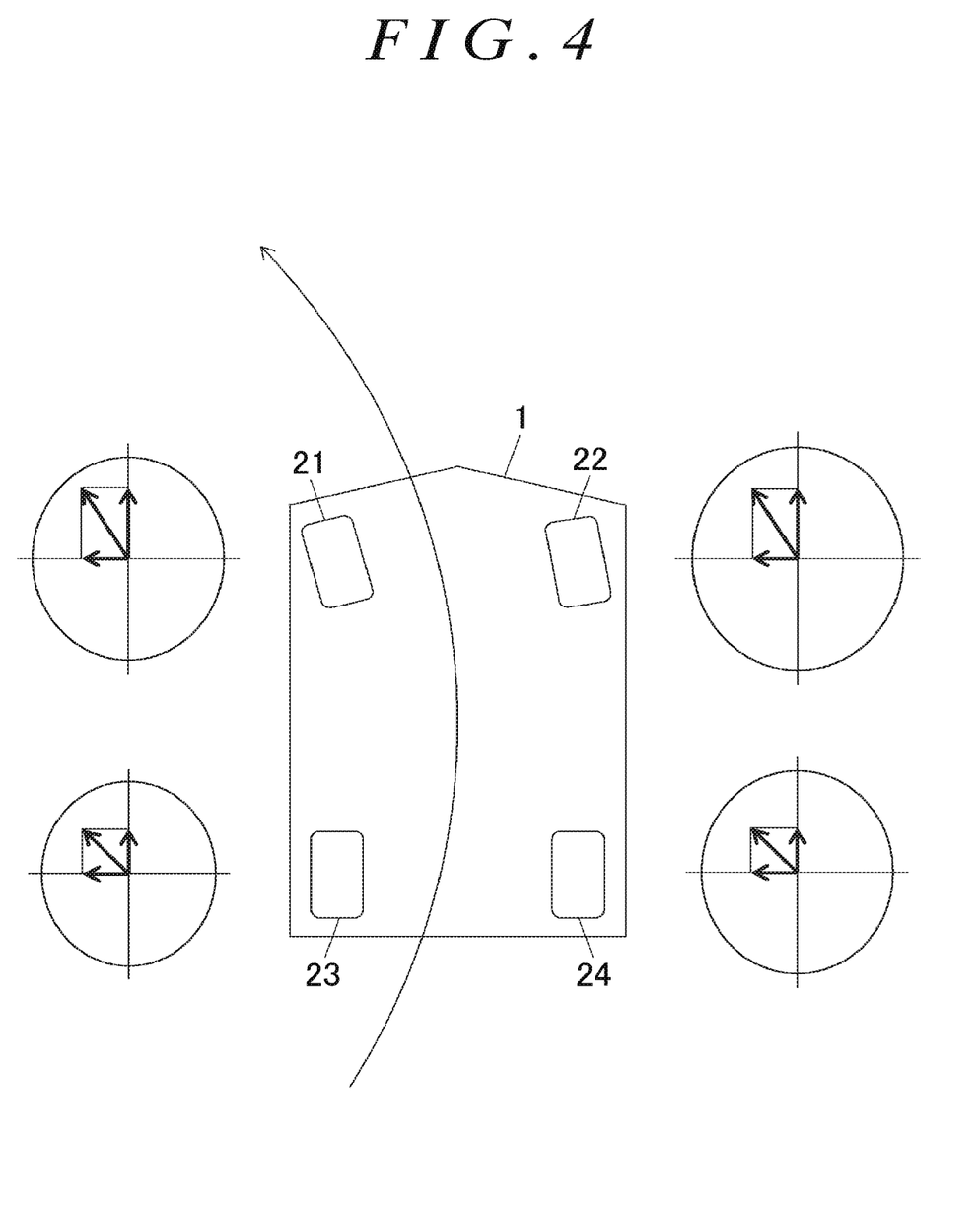
FIG. 4 is a diagram schematically illustrating the four-wheel drive vehicle making a turn to the left.

FIG. 4 is a diagram schematically illustrating the four-wheel drive vehicle 1 making a turn to the left. In FIG. 4, circles drawn adjacent to the wheels 21 to 24 represent their respective tire friction circles. The sizes of the tire friction circles of the front wheels 21 and 22 are larger than the sizes of the tire friction circles of the rear wheels 23 and 24 due to the weight of heavy components including the engine 11 and the transmission 13. Further, the size of the tire friction circle of the right front wheel 22 that is the outer wheel in the direction of the turn being made is larger than the size of the tire friction circle of the left front wheel 21 that is the inner wheel in the direction of the turn being made. Likewise, the size of the tire friction circle of the right rear wheel 24 is larger than the size of the tire friction circle of the left rear wheel 23.

In the example illustrated in FIG. 4, the tire-friction-force usage rate of the left front wheel 21 exceeds the threshold (0.8). In this case, the driving-braking force adjustment controller 74 increases the proportion of the driving force to be distributed to at least one of the wheels other than the left front wheel 21 while reducing the driving force of the left front wheel 21. More specifically, the driving-braking force adjustment controller 74 predicts the intention of a driver on the basis of the driving operation information and selects which wheel to distribute more driving force to, so as to cause the four-wheel drive vehicle 1 to behave in line with the driver's intention.

Figure 5:
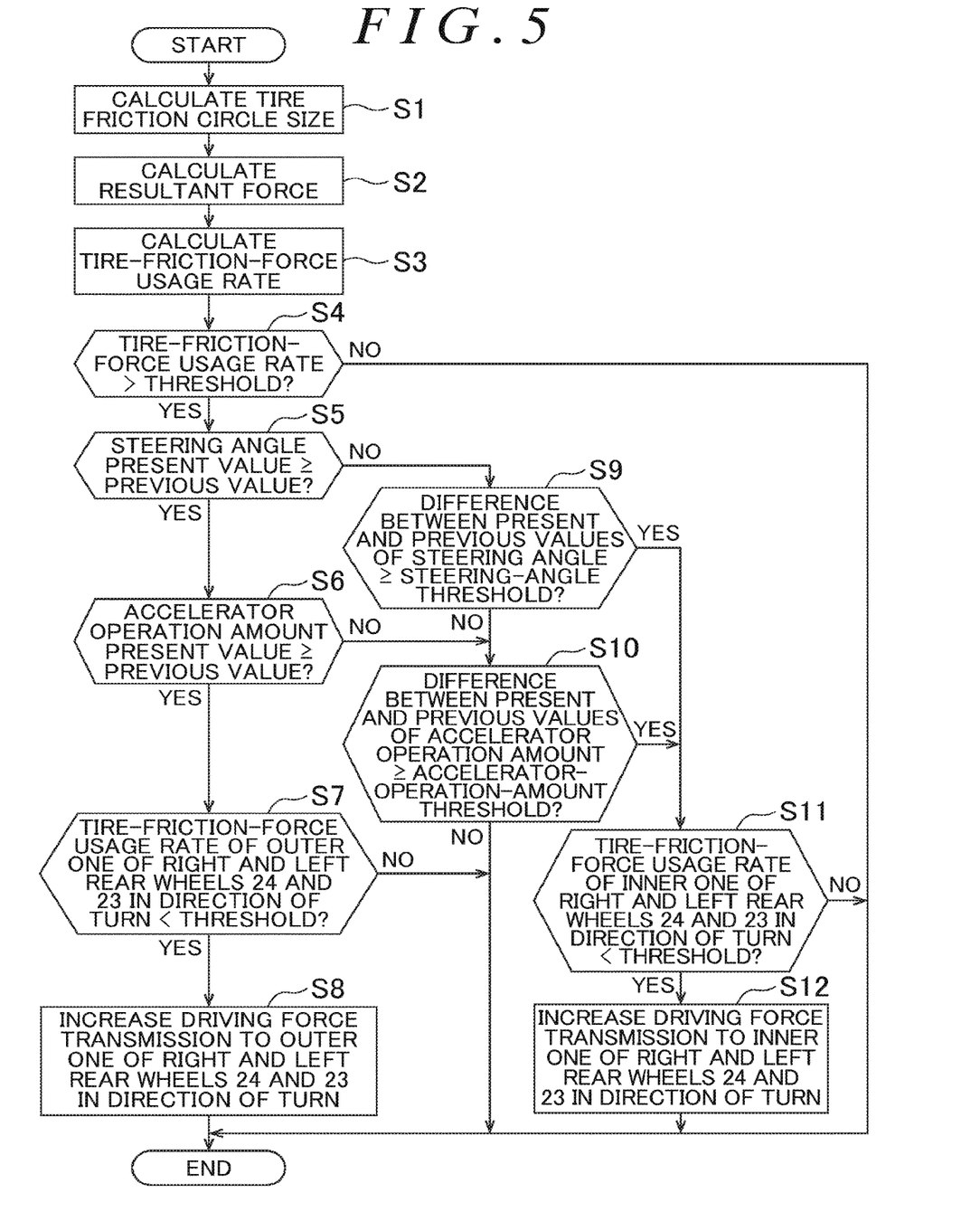
FIG. 5 is a flowchart illustrating an example of a process executed by a control unit of the control apparatus.

FIG. 5 is a flowchart illustrating an example of a process executed by the control unit 70 of the control apparatus 7. According to the first embodiment, the four-wheel drive vehicle 1 is a front-engine/front-drive (FF)-based four-wheel drive vehicle, i.e., the front wheels 21 and 22 serve as main drive wheels, and the rear wheels 23 and 24 serve as auxiliary drive wheels. For this reason, the following describes how the process increases the driving force of any of the rear wheels 23 and 24 when the tire-friction-force usage rate of any of the front wheels 21 and 22 exceeds the threshold. The control unit 70 executes the process illustrated in the flowchart repeatedly in predetermined calculation cycles.

In the process illustrated in the flowchart, the control unit 70 first calculates the size of the tire friction circle of each of the wheels 21 to 24 on the basis of their respective vertical loads and road surface friction coefficients (step S1), and then calculates the resultant force of each of the wheels 21 to 24 on the basis of their respective tire longitudinal forces and tire lateral forces (step S2). Next, the control unit 70 calculates the tire-friction-force usage rate of each of the wheels 21 to 24 on the basis of the results of calculation made in steps S1 and S2 (step S3). Then, the control unit 70 determines whether the tire-friction-force usage rate of any of the wheels 21 to 24 exceeds the threshold (S4). For example, assuming that the four-wheel drive vehicle 1 is making a turn to the left in a manner illustrated in FIG. 4, the tire-friction-force usage rate of the left front wheel 21 exceeds the threshold, and a Yes determination is made in step S4 (the determination condition is satisfied).

If a Yes determination is made in step S4, the control unit 70 determines whether a value of the steering angle (in absolute value) in a present calculation cycle is greater than or equal to a value of the steering angle in a previous calculation cycle (step S5). If a Yes determination is made in step S5, the control unit 70 determines, on the basis of a value detected by an accelerator-operation-amount sensor 191 that detects the amount of depression of an accelerator pedal 17 (refer to FIG. 1) as an accelerator operation amount, whether a value of the accelerator operation amount in the present calculation cycle is greater than or equal to a value of the accelerator operation amount in the previous calculation cycle (step S6). If a Yes determination is made in step S6, the control unit 70 determines whether the tire-friction-force usage rate of the outer one of the right and left rear wheels 24 and 23 in the direction of the turn being made is less than a threshold (step S7). A value of the threshold used in step S7 may be either equal to a value of the threshold used in step S4 or less than the value of the threshold used in step S4.

If a Yes determination is made in step S7, the control unit 70 increases the driving force of the outer one of the right and left rear wheels 24 and 23 in the direction of the turn being made (step S8). Specifically, the control unit 70 increases the duty ratio of a switching signal supplied to the inverter circuit 700 in such a manner as to increase the current supplied to one of the first and second actuators 358 and 359 corresponding to the outer wheel. Thus, part of the driving force to be transmitted to the front wheels 21 and 22 is diverted to the rear wheels 23 and 24. This control restrains an increase in the driving force of the front wheels 21 and 22 while increasing the driving force of the right rear wheel 24 during a turn to the left or while increasing the driving force of the left rear wheel 23 during a turn to the right. The increase in the driving force of the outer one of the right and left rear wheels 24 and 23 in the direction of the turn allows the four-wheel drive vehicle 1 to make the turn smoothly. Thus, the four-wheel drive vehicle 1 behaves in line with the driver's intention.

In contrast, if a No determination is made in step S5 (the determination condition is not satisfied), the control unit 70 determines whether a difference between the present and previous values of the steering angle is greater than or equal to a predetermined steering-angle threshold (step S9). If a No determination is made in step S9 or in step S6, the control unit 70 determines whether a difference between the present and previous values of the accelerator operation amount is greater than or equal to a predetermined accelerator-operation-amount threshold (step S10).

If a Yes determination is made in step S9 or step 10, the control unit 70 determines whether the tire-friction-force usage rate of the inner one of the right and left rear wheels 24 and 23 in the direction of the turn being made is less than a threshold (step S11). A value of the threshold used in step S11 may be either equal to the value of the threshold used in step S4 or less than the value of the threshold used in step S4.

If a Yes determination is made in step S11, the control unit 70 increases the driving force of the inner one of the right and left rear wheels 24 and 23 in the direction of the turn being made (step S12). Specifically, the control unit 70 increases the duty ratio of the switching signal supplied to the inverter circuit 700 in such a manner as to increase the current supplied to one of the first and second actuators 358 and 359 corresponding to the inner wheel.

Thus, part of the driving force to be transmitted to the front wheels 21 and 22 is diverted to the rear wheels 23 and 24. This control restrains an increase in the driving force of the front wheels 21 and 22 while increasing the driving force of the left rear wheel 23 during a turn to the left or while increasing the driving force of the right rear wheel 24 during a turn to the right. The increase in the driving force of the inner one of the right and left rear wheels 24 and 23 in the direction of the turn allows the four-wheel drive vehicle 1 to behave smoothly when returning to straight after the turn or when decelerating in response to release of the accelerator pedal 17 during the turn. Thus, the four-wheel drive vehicle 1 behaves in line with the driver's intention.

In the flowchart described above, the procedure of step S1 is executed by the control unit 70 functioning as the tire friction circle calculator 71, and the procedure of step S2 is executed by the control unit 70 functioning as the resultant force calculator 72. Further, the procedure of step S3 is executed by the control unit 70 functioning as the tire-friction-force usage rate calculator 73, and the procedures of steps S4 to S12 are executed by the control unit 70 functioning as the driving-braking force adjustment controller 74.

If the four-wheel drive vehicle 1 has autonomous driving features, driving force of each wheel may be adjusted by the same process as described above during autonomous driving. In this case, a value of a driving force command for the driving force from an autonomous driving system may be used instead of the accelerator operation amount in steps S6 and S10.

As described above, according to the first embodiment, when the tire-friction-force usage rate of any of the wheels 21 to 24 exceeds a predetermined threshold of less than one, the control unit 70 restrains an increase in the driving force of the wheel while increasing the driving force of at least one of the other wheels that is selected on the basis of the driving operation information indicative of the state of a driving operation by a driver, thus preventing the tire-friction-force usage rate from exceeding one (100%). This control helps to prevent wheel slip, thus improving vehicle traveling stability.

Further, according to the process illustrated in the flowchart in FIG. 5, when the tire-friction-force usage rate of at least one of the front wheels 21 and 22 exceeds the threshold during a turn of the four-wheel drive vehicle 1, the driving force applied to the outer one of the rear wheels 23 and 24 in the direction of the turn is increased upon satisfaction that both the amount of depression of the accelerator pedal 17 and the value of the steering angle are increasing, and the driving force applied to the inner one of the rear wheels 23 and 24 in the direction of the turn is increased upon satisfaction that the amount of depression of the accelerator pedal 17 or the value of the steering angle is decreasing. This control allows a smooth transition from traveling straight to turning and from turning to traveling straight, thus further improving vehicle traveling stability. In the flowchart described above, the amount of depression of the accelerator pedal 17 and the value of the steering angle are used as the driving operation information.

Figure 6:
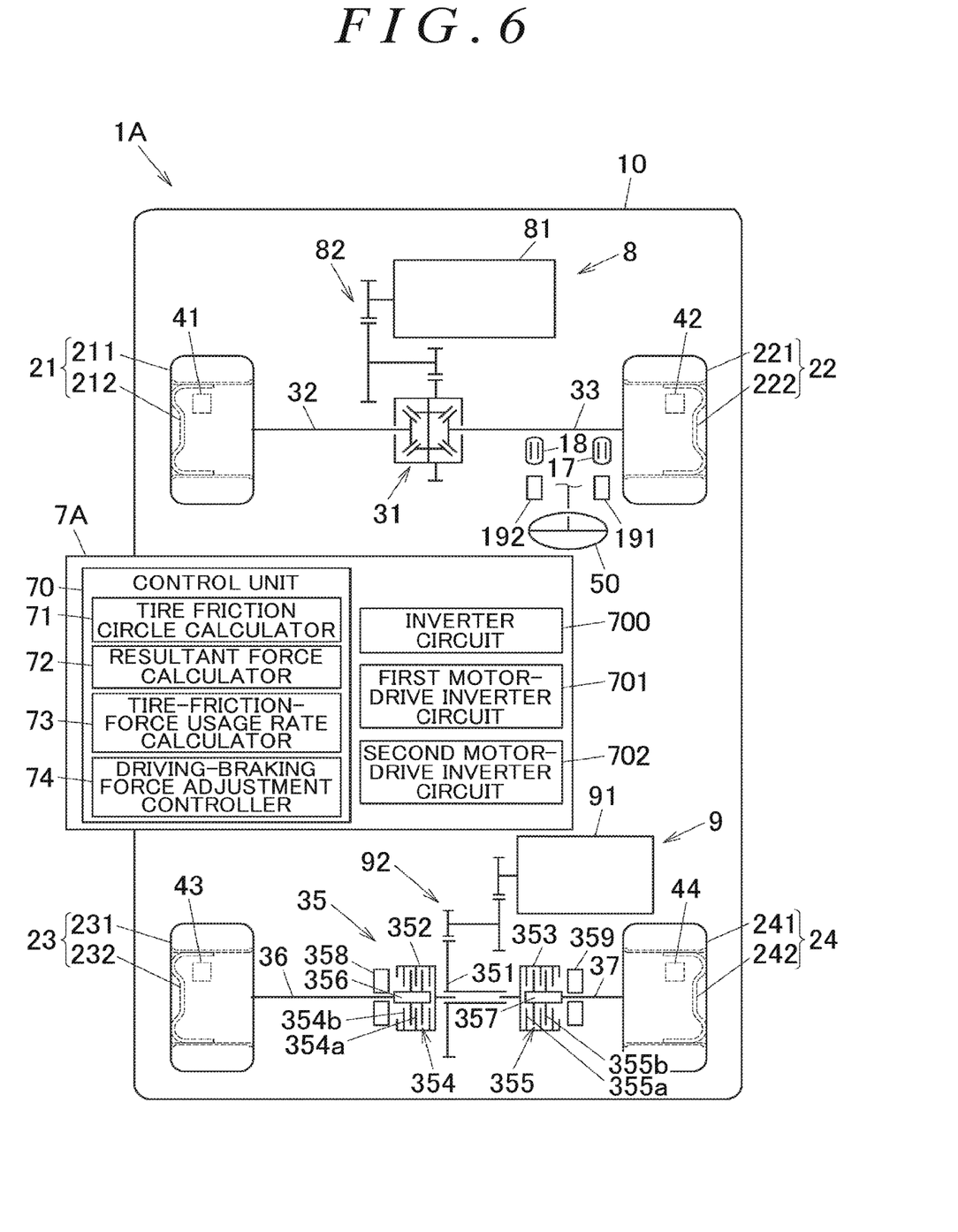
FIG. 6 is a diagram schematically illustrating an example structure of a four-wheel drive vehicle according to a second embodiment of the invention.

Next, a second embodiment of the invention is described with reference to FIGS. 6 and 7. FIG. 6 is a diagram schematically illustrating an example structure of a four-wheel drive vehicle 1A according to the second embodiment. Elements common between FIG. 6 and FIG. 1 retain the same reference symbols as used in FIG. 1, and already described features of the common elements are not described again.

According to the first embodiment, the driving force generated by the engine 11 is distributed both to the front wheels 21 and 22 and to the rear wheels 23 and 24. In contrast, according to the second embodiment, the front wheels 21 and 22 are driven by a first drive unit 8, and the rear wheels 23 and 24 are driven by a second drive unit 9.

The first drive unit 8 includes an electric motor 81 and a speed reduction mechanism 82 that reduces the speed of a rotational output of the electric motor 81. The second drive unit 9 includes an electric motor 91 and a speed reduction mechanism 92 that reduces the speed of a rotational output of the electric motor 91.

Driving force generated by the first drive unit 8 is transmitted to the front wheels 21 and 22 through the front differential 31 and the front drive shafts 32 and 33. Driving force generated by the second drive unit 9 is transmitted to the rear wheels 23 and 24 through the driving force distribution unit 35 and the rear drive shafts 36 and 37. According to the second embodiment, the maximum output of the electric motor 81 of the first drive unit 8 is greater than the maximum output of the electric motor 91 of the second drive unit 9, and the driving force of the first drive unit 8 is mainly used to propel the four-wheel drive vehicle 1A during normal traveling where the behavior of the four-wheel drive vehicle 1A is stable.

As with the control unit 70 of the control apparatus 7 of the first embodiment, a control unit 70 of a control apparatus 7A of the second embodiment includes a tire friction circle calculator 71, a resultant force calculator 72, a tire-friction-force usage rate calculator 73, and a driving-braking force adjustment controller 74. According to the second embodiment, the driving-braking force adjustment controller 74 controls the electric motors 81 and 91 of the first and second drive units 8 and 9, in addition to a driving force distribution unit 35.

The control apparatus 7A further includes the following: an inverter circuit 700 that supplies electric current to first and second actuators 358 and 359 of the driving force distribution unit 35; a first motor-drive inverter circuit 701 that supplies motor current to the electric motor 81 of the first drive unit 8; and a second motor-drive inverter circuit 702 that supplies motor current to the electric motor 91 of the second drive unit 9. A switching signal generated by the driving-braking force adjustment controller 74 switches on and off switching elements of the first motor-drive inverter circuit 701, thus causing the first motor-drive inverter circuit 701 to supply the motor current to the electric motor 81. A switching signal generated by the driving-braking force adjustment controller 74 switches on and off switching elements of the second motor-drive inverter circuit 702, thus causing the second motor-drive inverter circuit 702 to supply the motor current to the electric motor 91.

The driving-braking force adjustment controller 74 causes the first and second drive units 8 and 9 to generate necessary driving force or regenerative braking force on the basis of the amount of depression of the accelerator pedal 17 detected by an accelerator-operation-amount sensor 191 or on the basis of the amount of depression of the brake pedal 18 detected by a brake pedal sensor 192.

Figure 7A:
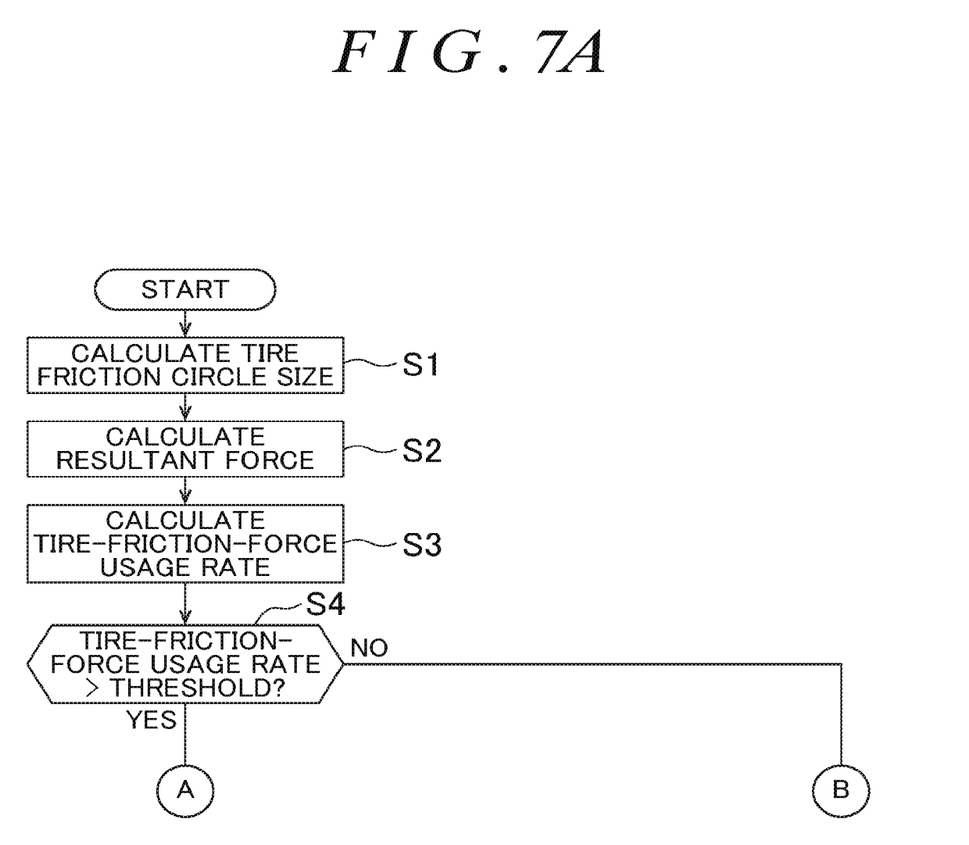
FIG. 7A is a flowchart illustrating an example of a process executed by a control unit of a control apparatus according to the second embodiment of the invention.
Figure 7B:
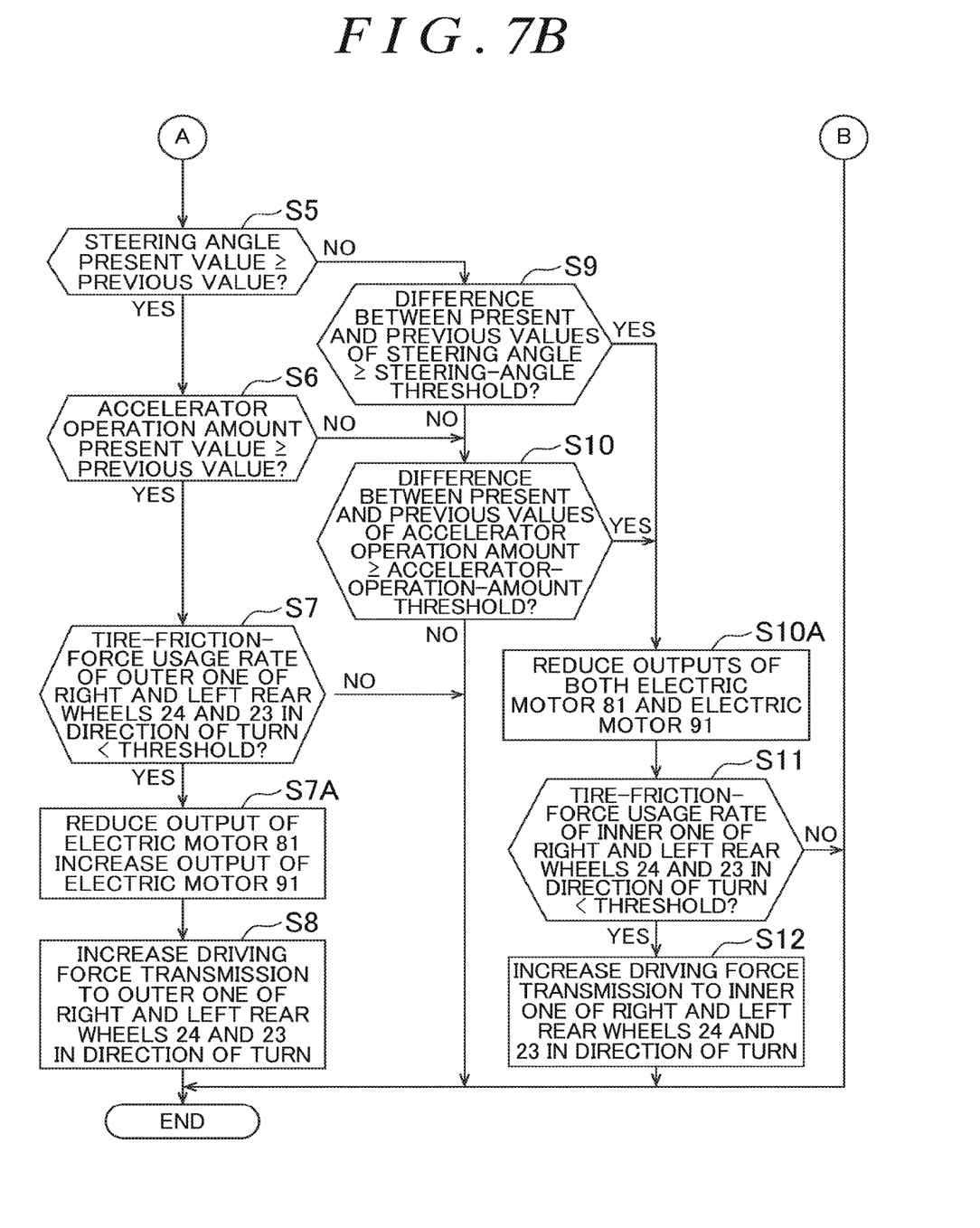
FIG. 7B is a flowchart illustrating an example of a process executed by a control unit of a control apparatus according to the second embodiment of the invention.

FIG. 7A and FIG. 7B are flowcharts illustrating an example of a process executed by the control unit 70 of the control apparatus 7A according to the second embodiment. Steps common between FIG. 7A, FIG. 7B and FIG. 5 retain the same reference symbols as used in FIG. 5, and already described procedures of the common steps are not described again.

According to the second embodiment, if a Yes determination is made in step S7, the process proceeds to step S7A where the control unit 70 reduces the output of the electric motor 81 of the first drive unit 8 while increasing the output of the electric motor 91 of the second drive unit 9. At this time, the control unit 70 controls the electric motors 81 and 91 of the first and second drive units 8 and 9 in such a manner that the amount of increase in the output of the electric motor 91 is greater than the amount of reduction in the output of the electric motor 81, thus increasing the total driving force that is the sum of the outputs of the electric motors 81 and 91.

Further, according to the second embodiment, if a Yes determination is made in step S9 or S10, the process proceeds to step S10A where the control unit 70 reduces the outputs of both the electric motors 81 and 91 of the first and second drive units 8 and 9.

As with the first embodiment, the second embodiment helps to prevent wheel slip, thus improving vehicle traveling stability. Further, according to the second embodiment, the driving force generated by the first drive unit 8 that drives the front wheels 21 and 22, and the driving force generated by the second drive unit 9 that drives the rear wheels 23 and 24 are adjustable separately. This feature increases the flexibility of driving force adjustment, thus improving vehicle traveling stability more effectively.

Although the first and second embodiments described above illustrate that the control apparatuses 7 and 7A adjust the driving force applied to the front wheels 21 and 22 and the rear wheels 23 and 24, wheel slip tends to occur during braking as well as during a turn. Therefore, the technical concept described in the embodiments may be applied to reduce the likelihood of occurrence of wheel slip during braking so as to improve vehicle traveling stability. Specifically, when the tire-friction-force usage rate of any of the wheels 21 to 24 exceeds a predetermined threshold of less than one during vehicle braking, the driving-braking force adjustment controller 74 controls the braking system 4 in a manner that restrains an increase in the braking force of the wheel while increasing the braking force of at least one of the other wheels that is selected on the basis of the driving operation information indicative of the state of a driving operation by a driver. This control allows a reduction in the likelihood of occurrence of wheel slip without changing the total braking force applied to the wheels 21 to 24. Further, when an electric motor is used as a drive source as in the second embodiment, regenerative braking force may be generated.

The embodiments may be modified in various ways within the scope of the invention. For example, an in-wheel motor system may be used to drive the front wheels 21 and 22 and the rear wheels 23 and 24. The braking system 4 is not limited to a structure that actuates the brake calipers 41 to 44 by hydraulic pressure of brake fluid. For example, the braking system 4 may use an electric brake that generates braking force with an electric actuator.

The steering system 5 may be a steer-by-wire steering system. In this case, the tire lateral force may be calculated on the basis of the output of an electric actuator that steers the front wheels 21 and 22. According to the embodiments, only the front wheels 21 and 22 are steered wheels. Alternatively, only the rear wheels 23 and 24 may be steered wheels, as in typical forklift steering systems. Further alternatively, all the wheels 21 to 24 may be steered wheels.

What is claimed is:

1. An apparatus for controlling a four-wheel drive vehicle including two front wheels and two rear wheels, each of the four wheels having a tire, the apparatus comprising:
   a tire friction circle calculator that calculates a size of a tire friction circle of each of the four wheels on a basis of vehicle information including a vertical load on the tire;
   a resultant force calculator that calculates a magnitude of a resultant force of lateral and longitudinal forces of the tire for each of the four wheels;
   a tire-friction-force usage rate calculator that calculates a tire-friction-force usage rate of each of the four wheels, the tire-friction-force usage rate being a ratio of the magnitude of the resultant force to the size of the tire friction circle; and a driving-braking force adjustment controller that adjusts driving force or braking force applied to each of the four wheels, wherein when the tire-friction-force usage rate of any of the four wheels exceeds a predetermined threshold of less than one, the driving-braking force adjustment controller restrains an increase in the driving force or the braking force of the any of the four wheels while increasing the driving force or the braking force of at least one of the others of the four wheels, the at least one of the others of the four wheels being selected on a basis of driving operation information indicative of a state of a driving operation by a driver.

2. The apparatus according to claim 1, wherein
the resultant force calculator calculates the lateral force on a basis of an axial force acting, during a turn of the vehicle, on a steered shaft that steers steered wheels out of the four wheels.

3. The apparatus according to claim 1, wherein
when the tire-friction-force usage rate of at least one of the two front wheels exceeds the threshold during a turn of the vehicle, the driving-braking force adjustment controller increases the driving force applied to an outer one of the two rear wheels in a direction of the turn upon satisfaction that a value of a steering angle and one of an amount of depression of an accelerator pedal and a value of a driving force command are increasing.

4. The apparatus according to claim 1, wherein
when the tire-friction-force usage rate of at least one of the two front wheels exceeds the threshold during a turn of the vehicle, the driving-braking force adjustment controller increases the driving force applied to an inner one of the two rear wheels in a direction of the turn upon satisfaction that a value of a steering angle or one of an amount of depression of an accelerator pedal and a value of a driving force command is decreasing.

* * * * *